United States Patent
Saito et al.

(10) Patent No.: US 8,507,121 B2
(45) Date of Patent: Aug. 13, 2013

(54) BATTERY TEMPERATURE UNEVENNESS SUPPRESSING POWER SUPPLY

(75) Inventors: Masao Saito, Kasai (JP); Shinsuke Nakamura, Kobe (JP); Akinobu Wakabayashi, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 257 days.

(21) Appl. No.: 12/914,179

(22) Filed: Oct. 28, 2010

(65) Prior Publication Data

US 2011/0104547 A1 May 5, 2011

(30) Foreign Application Priority Data

Oct. 29, 2009 (JP) ................. 2009-248595

(51) Int. Cl.
*H01M 10/50* (2006.01)
(52) U.S. Cl.
USPC ................. 429/120; 429/96; 429/71
(58) Field of Classification Search
None
See application file for complete search history.

(56) References Cited

U.S. PATENT DOCUMENTS

| | | | |
|---|---|---|---|
| 4,522,898 A | | 6/1985 | Esrom |
| 5,019,465 A | * | 5/1991 | Herron et al. ............. 429/97 |
| 5,585,204 A | * | 12/1996 | Oshida et al. ............. 429/62 |
| 5,824,432 A | * | 10/1998 | Currle ..................... 429/120 |
| 2008/0187820 A1 | | 8/2008 | Nakano et al. |
| 2009/0017366 A1 | * | 1/2009 | Wood et al. ............... 429/62 |
| 2009/0142650 A1 | * | 6/2009 | Okada et al. ............. 429/71 |

FOREIGN PATENT DOCUMENTS

| | | |
|---|---|---|
| EP | 2 317 586 | 5/2011 |
| JP | 2002-141114 | 5/2002 |
| JP | 2004-87218 | 3/2004 |
| JP | 2007-250515 | 9/2007 |
| WO | 2008/153326 | 12/2008 |

OTHER PUBLICATIONS

European Search Report (in English language) issued Feb. 17, 2011 in corresponding European Patent Application No. 10 01 4029.
European Official Communication (in English language) issued Feb. 27, 2013 in corresponding European patent application No. 10 014 029.2.

* cited by examiner

*Primary Examiner* — Cynthia Walls
(74) *Attorney, Agent, or Firm* — Wenderoth, Lind, Ponack, LLP (57) ABSTRACT

A power supply device is provided that includes a battery module (3) and a cooling mechanism. The battery module is composed of a plurality of batteries (20) arranged side by side. The cooling mechanism cools the batteries (20). A thermally-insulating member (70) is arranged on a part of a battery module surface, and thermally insulates heat generated from the batteries. This power supply device can reduce the temperature unevenness ΔT.

17 Claims, 9 Drawing Sheets

BATTERY TEMPERATURE UNEVENNESS SUPPRESSING POWER SUPPLY

BACKGROUND OF THE INVENTION

1. Field of the Invention

The present invention relates to a battery module that is composed of a plurality of batteries arranged side by side, and in particular to a power supply device that includes batteries and evens the temperatures of the batteries to be used for electric motors for driving hybrid cars, fuel cars, and electric vehicles.

2. Description of the Related Art

In vehicle power supply devices, a large amount of current is repeatedly charged/discharged. Accordingly, vehicle power supply devices include a plurality of batteries arranged side by side. When vehicles are driven, the batteries generate heat. As a result, the temperatures of batteries will rise. If the batteries store the generated heat, the batteries will deteriorate in performance. For this reason, it is necessary to cool the batteries. In one of methods for cooling batteries, a cooling structure is constructed in such a power supply device, and cooling air is blown toward the cooling structure to cool the batteries. However, it is difficult to evenly cool the batteries. The reason is that a battery near the cooling air inlet is cooled by colder air at a higher flow rate and is likely to be over-cooled, while a battery, which is the furthest away from the cooling air inlet, is cooled at a lower flow rate relative to the battery on the cooling air inlet side and is likely to be poorly cooled so that a temperature difference among between the batteries will arise. For this reason, as the number of batteries increases, it becomes more difficult to evenly cool the batteries, and the temperature difference will increase. In addition, if a cooling gas or fluid with large thermal capacity is used to increase cooling performance, the temperature difference will increase.

If batteries are unevenly cooled, some of the batteries that are poorly cooled may deteriorate faster so that the lives of some batteries may be reduced. In addition, this unevenness will increase as the batteries are used over a long period of time. Accordingly, the charging/discharging capacities of the power supply device will decrease. Also, some of the batteries will be easily overcharged/over-discharged, which in turn accelerates deterioration of some of the batteries. Consequently, such unevenness may cause life reduction of the power supply device as a whole. For this reason, in vehicle power supply devices, the deterioration of some batteries results in a problem with the power supply device as a whole, and reduces the entire performance of the power supply device. If one of the batteries cannot be used, a power supply device cannot be used that is composed of a plurality of batteries serially connected to each other. For the aforementioned reason, although it is also important for vehicle power supply devices to bring batteries lower than a predetermined temperature, it is more important to control the temperatures of the batteries so as to evenly cool the batteries, which are arranged side by side, so that the temperature difference among the batteries is minimized.

Known battery cooling structures for evenly cooling batteries include a device box arranged on the upstream side of an inlet chamber, and a wall surface of the device box facing the inlet chamber being constructed in various shapes. For example, a battery cooling structure has been developed in Japanese Patent Laid-Open Publication No. 2007-250515.

Specifically, in this battery cooling structure, a member with a protruding portion or a recessed portion is provided on the wall surface of the device box facing the inlet chamber so as to deflect cooling air flow away from a battery pack so that cooling air that flows into cooling air paths on the upstream side is reduced and cooling air that flows into cooling air paths on the downstream side is increased thereby evening flow rates of cooling air in a battery module and reducing the temperature difference.

Also, a battery cooling structure has been developed that includes, instead of the air flow deflecting member that deflects a cooling air flow and is provided on the wall surface of the device box, a driven member that can be driven by an electric motor. In this battery cooling structure, the flow rate of cooling air can be adjusted based on a cooling requirement to reduce the temperature difference.

In addition, if the temperatures of the batteries become high, a ventilation fan is provided with a larger amount of power to increase the flow rate of cooling gas.

In these types of cooling structures that change the flowing direction and the flow rate of cooling air, since cooling air paths are not limited, the cooling air can flow either in longitudinal or traverse directions in the cooling air paths.

In the power supply device disclosed in the JP 2007-250515 A, the air flow deflecting member is provided on a part of the device box on the upstream side of the inlet chamber and deflects cooling air flow so as to even the flow rates and reduce temperature unevenness. However, since the air flow deflecting member requires a shaping process or an attachment process, there is a problem in that productivity will be low. In addition, since material, shaping and assembling costs are required, there is a problem in that the production cost will be high. Also, in this power supply device, since cooling air flow is deflected only on the upstream side where the air flow deflecting member is provided, the deflection amount gets smaller toward the downstream side of the inlet chamber. Accordingly, there is a disadvantage in that the effect will be limited that evens the flow rates in the battery module.

For this reason, this battery cooling structure is not suitable for a structure that includes a number of batteries connected to each other. If a number of air flow deflecting members are provided, pressure loss caused by the air flow deflecting members will be increased. In addition to this, it will be very difficult to optimize the arrangement, shape and the like of air flow deflecting members.

Also, in the battery cooling structure that includes, instead of the air flow deflecting member that deflects a cooling air flow and is provided on the wall surface of the device box, a driven member that can be driven by an electric motor so that the flow rate of cooling air can be adjusted based on a cooling requirement to reduce the temperature difference, this battery cooling structure will have the aforementioned problems and disadvantages, and additionally will have a possibility that the flowing direction and the flow rate of the cooling air may not be adjusted in the event of electric motor failure or the like. If the electric motor cannot be properly activated so that the air flow deflecting member is held retracted in the device box, a battery on the upstream of the inlet chamber may be over-cooled so that the output of this battery may be reduced. As a result, there is a problem in that the battery module may be affected as a whole.

In addition, in this cooling structure, since the flow rate is changed based on the battery cooling requirement, there is a disadvantage in that the position and state of a vortex area produced by the air flow deflecting member will change.

It is an object of the present invention to provide a power supply device that can be simply constructed in various types of structures but can reduce the temperature unevenness ΔT in the power supply device, thereby increasing the life and ensuring the performance of the power supply device.

SUMMARY OF THE INVENTION

To achieve the above object, a power supply device according to a first aspect of the present invention includes a battery module, a cooling mechanism and a thermally-insulating member. The battery module is composed of a plurality of batteries arranged side by side. The cooling mechanism cools the batteries. The thermally-insulating member is arranged on a part of a surface of the battery module, and thermally insulates heat generated from at least one of the plurality of batteries.

In a power supply device according to a second aspect of the present invention, the thermally-insulating member is in contact with the at least one of the plurality of batteries.

A power supply device according to a third aspect of the present invention further includes an accommodation case that accommodates the battery module, and has inlet and outlet ports. Coolant that is moved by operation of the cooling mechanism flows through the inlet and outlet ports. The at least one of the plurality of batteries, on or above which the thermally-insulating member is arranged, is located in proximity to the inlet port.

A power supply device according to a fourth aspect of the present invention further includes separators that are arranged between the batteries, and end plates that are arranged on both ends of the battery module. The separators and the end plates have cooling paths through which the coolant flows from the inlet port. The thermally-insulating member closes some of the cooling paths.

In a power supply device according to a fifth aspect of the present invention, the thermally-insulating member extends over two or more batteries so that the contact areas between the two or more batteries and the thermally-insulating member decrease or get closer to constant with the distance from the inlet port.

A power supply device according to a sixth aspect of the present invention further includes coupling members that hold the end plates and the battery module. The end plates and the battery module are interposed between the ends of each of the coupling members. The thermally-insulating member is attached to the end plate or the coupling member.

A power supply device according to a seventh aspect of the present invention further includes coupling members that hold the end plates and the battery module. The end plates and the battery module are interposed between the ends of each of the coupling members. The thermally-insulating member is attached to the end plate and the coupling member.

In a power supply device according to an eighth aspect of the present invention, the thermally-insulating member is attached to the end plate or the coupling member by a fit-in structure.

In a power supply device according to a ninth aspect of the present invention, the thermally-insulating member is attached to the end plate and the coupling member by a fit-in structure.

According to the first aspect of the present invention, since the thermally-insulating member is arranged on a part of a surface of the battery module, for example, in the case where the thermally-insulating member is arranged in proximity to a battery that is likely to be cooled to a relatively lower temperature by the cooling mechanism, it is possible to suppress dissipation of heat generated by this battery. As a result, it is possible to bring this battery to a higher temperature. That is, since this battery is held warm by heat generated by the battery itself, it is possible to suppress unevenness of battery temperatures in the power supply device.

Also, since heat generated by a battery is effectively used to warm the battery, it is possible to reduce the cost associated with warming a battery. In addition, since the size and arrangement of the thermally-insulating member, and the type of cooling mechanism are not limited, the thermally-insulating member can be easily arranged in any type of power supply device.

According to the second aspect of the present invention, since the thermally-insulating member is in contact with the at least one battery, no gap is provided between the at least one battery and the thermally-insulating member. Accordingly, dissipation of the heat can be minimized. Therefore, improvement of the above effect can be expected. In addition, since the thermally-insulating member can suppress the effect of the cooling mechanism on a battery that is likely to be excessively cooled, it is possible to prevent this battery from being cooled too much.

According to the third aspect of the present invention, since the thermally-insulating member is arranged on or above at least one battery located in proximity to the inlet port, it is possible to raise the temperature of a battery on the inlet port side that is generally likely to be lower in comparison with a battery on the outlet port side. The thermally-insulating member prevents heat generated by a battery from being dissipated out of the battery module. Therefore, it is possible to reduce battery temperature unevenness in the power supply device. In addition, since the temperatures of a plurality of batteries in proximity to the inlet port are likely to be lower, there is an advantage in that the thermally-insulating member can be collectively arranged over the plurality of batteries on the inlet port side.

According to the fourth aspect of the present invention, since the thermally-insulating member closes some of the cooling paths of the separators and the end plates, batteries can be thermally insulated in accordance with thermal insulation requirements of the batteries, the temperatures of which are likely to be relatively lower. Therefore, it is possible to minimize battery temperature unevenness, that is, to even battery temperatures. In addition, since the thermally-insulating member closes the cooling paths so as not to allow the coolant to flow into the cooling paths, it is possible to prevent that the temperatures of the batteries from becoming too low. Also, since the thermally-insulating member closes the cooling paths, it is not necessary to shape the separator and the end plate into different shapes. Accordingly, it is possible to provide commonality of parts. Therefore, it is possible to greatly reduce cost and man-hours.

According to the fifth aspect of the present invention, since the thermally-insulating member covers two or more batteries so that the contact areas between the two or more batteries and the thermally-insulating member decrease or get closer to constant with the distance from the inlet port, the levels of thermal insulation or cooling performance can be varied. If the contact areas are large, the number of closed cooling paths or the closed area of a cooling path of the end plate or the separator can be increased. As a result, it is possible to increase the thermal insulation effect on batteries in proximity to the inlet port. On the other hand, if the contact areas are small, the number of closed cooling paths or the closed area of a cooling path of the end plate or the separator adjacent to batteries away from the inlet port can be reduced. As a result, it is possible to reduce the thermal insulation effect on these batteries. Consequently, it is possible to further reduce battery temperature unevenness. In addition, since the thermally-insulating member covers two or more batteries, there are advantages in that thermally-insulating members required for battery temperature unevenness reduction can be produced as the same structure, and the thermally-insulating member can be easily attached.

According to the sixth aspect of the present invention, since the thermally-insulating member is attached to the end plate or the coupling member, an additional member is not required to hold the thermally-insulating member. In addition, since the coupling member faces the plurality of batteries arranged side by side, the arrangement and the shape of the thermally-insulating member is not limited.

According to the seventh aspect of the present invention, since the thermally-insulating member is attached to the end plate and the coupling member, the same effect as in the sixth aspect of the present invention can be expected. In addition, since the number of the attachment parts of the thermally-insulating member is increased, the thermally-insulating member can be more securely and stably attached.

According to the eighth aspect of the present invention, since the thermally-insulating member is attached to the end plate or the coupling member by a fit-in structure, the thermally-insulating member can be easily attached to the battery module. Therefore, it is possible to greatly reduce costs and the necessary man-hours as compared with attachment by a screw fastening structure or the like. In addition, since the attachment part in the fit-in structure can be flat, it is possible to reduce pressure loss when cooling air or the like flows.

According to the ninth aspect of the present invention, since the thermally-insulating member is attached to the end plate and the coupling member by a fit-in structure, the same effect as in the eighth aspect of the present invention can be expected. In addition, since the number of the attachment parts of the fit-in structure is increased, the thermally-insulating member can be more securely and stably attached.

In the case where a vehicle includes the aforementioned power supply device, it is possible to provide a battery module that can be simply constructed but can reduce the temperature unevenness $\Delta T$ in the battery module, thereby increasing the life of the battery module. In addition, since a vehicle that includes the aforementioned power supply device can be flexibly changed in design, this vehicle is suitable for frequent design change.

The above and further objects of the present invention as well as the features thereof will become more apparent from the following detailed description to be made in conjunction with the accompanying drawings.

DETAILED DESCRIPTION OF THE EMBODIMENT(S)

The following description will describe embodiments according to the present invention with reference to the FIGS. 1 to 9.

A power supply device according to the present invention can be installed on electric vehicles such as hybrid cars that are driven by both an engine and a motor, and electric vehicles that are driven only by a motor. The power supply device can be used as a power supply device for these types of vehicles. Exemplary cars including the power supply device are now described with reference to FIGS. 1 and 2.

Figure 1:
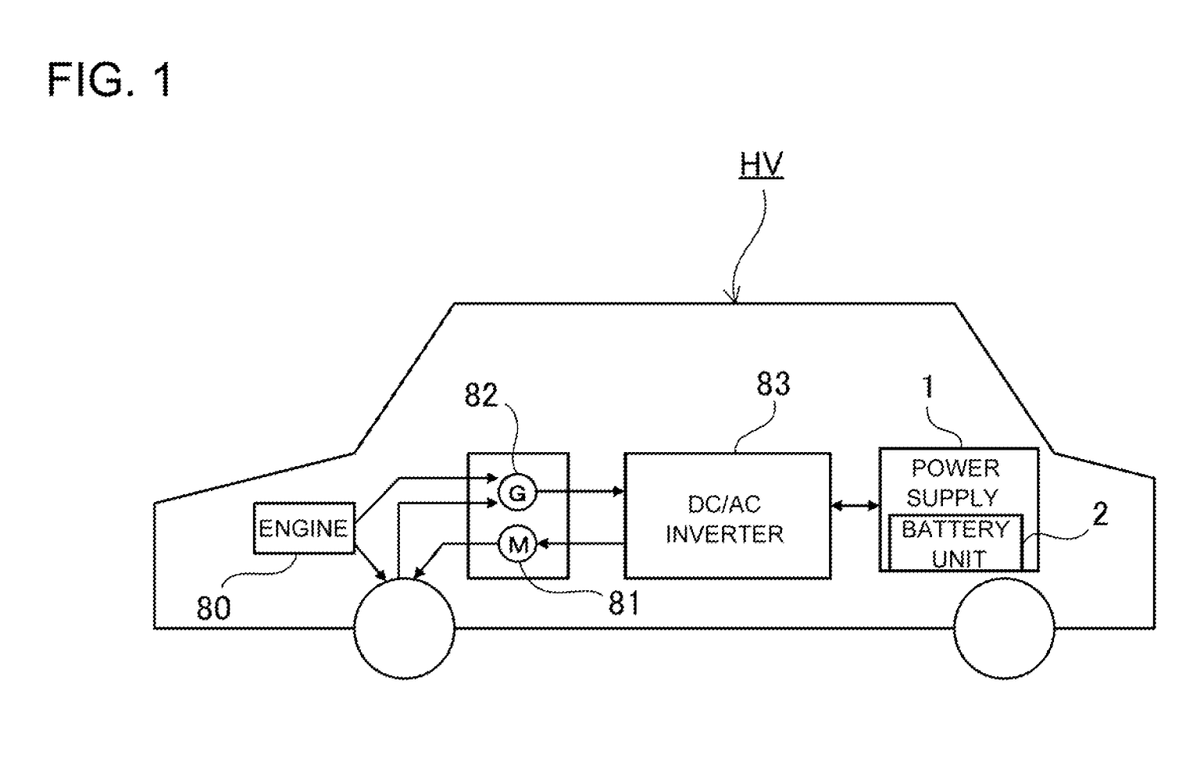
FIG. 1 is a diagram showing an HV including a power supply device according to the present invention.

FIG. 1 is a block diagram showing an exemplary hybrid car (vehicle HV) that is driven both by an engine 80 and an electric motor 81, and includes a power supply device 1. The illustrated vehicle HV with the power supply device 1 includes the electric motor 81 and the engine 80 that drive the vehicle HV, the power supply device 1 including a battery unit 2 that supplies electric power to the electric motor 81, and an electric generator 82 that charges the battery unit 2 of the power supply device 1. The power supply device 1 is connected to the electric motor 81 and the electric generator 82 via a DC/AC inverter 83. The vehicle HV is driven both by the electric motor 81 and the engine 80 with the battery unit 2 of the power supply device 1 being charged/discharged. The electric motor 81 is energized and drives the vehicle in a poor engine efficiency range, e.g., in acceleration or in a low speed range. The electric motor 81 is energized by electric power that is supplied from the power supply device 1. The electric generator 82 is driven by the engine 80 or by regenerative braking when users brake the vehicle so that the batteries 20 of the power supply device 1 are charged.

Figure 2:
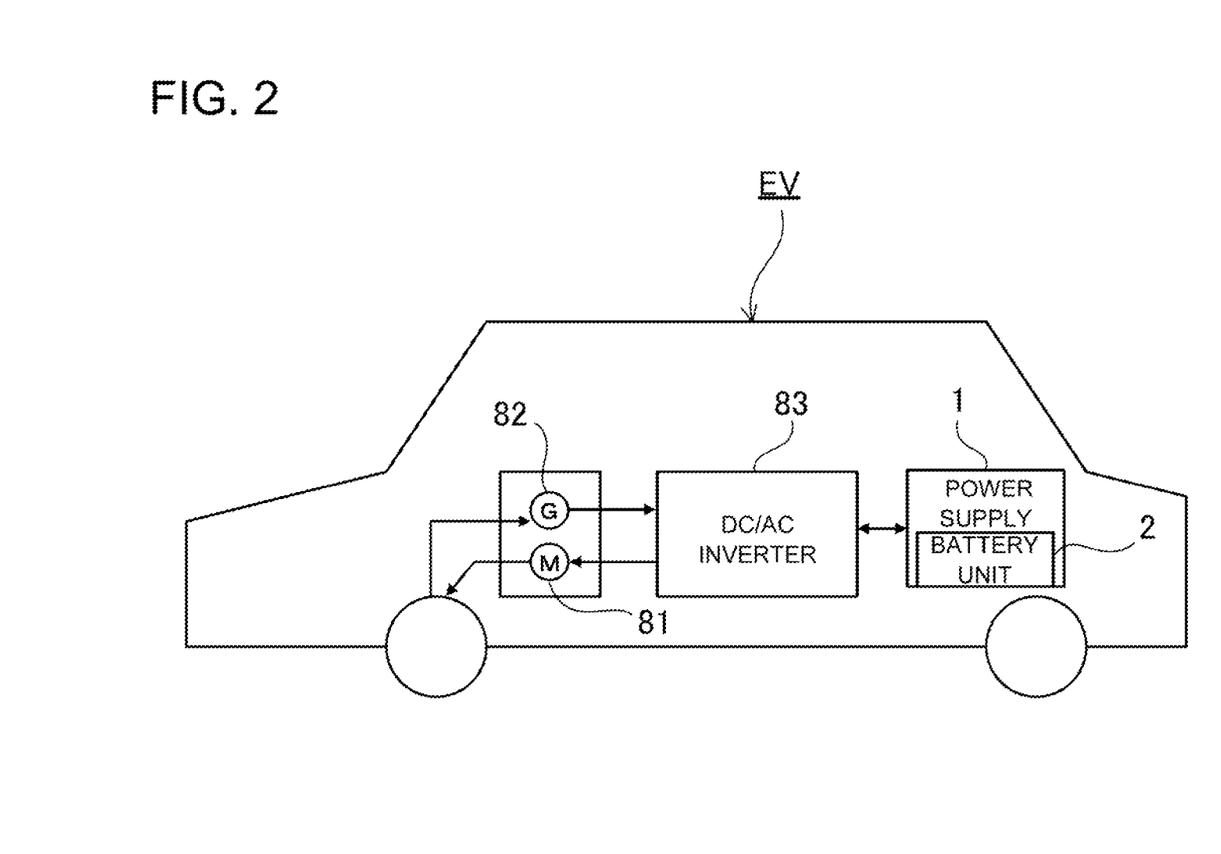
FIG. 2 is a diagram showing an EV including a power supply device according to the present invention.

FIG. 2 shows an exemplary electric vehicle (vehicle EV) that is driven only by an electric motor 81, and includes the power supply device 1. The illustrated vehicle EV with the power supply device 1 includes the electric motor 81 that drives the vehicle EV, the power supply device 1 that supplies electric power to the electric motor 81, and an electric generator 82 that charges the battery unit 2 of the power supply device 1. The power supply device 1 is connected to the electric motor 81 and the electric generator 82 via a DC/AC inverter 83. The electric motor 81 is energized by electric power that is supplied from the power supply device 1. The electric generator 82 can be driven by vehicle EV regenerative braking so that the batteries 20 of the power supply device 1 are charged.

The power supply device 1 according to an embodiment of the present invention to be installed in the aforementioned vehicles is now described with reference to FIGS. 3 to 9.

Figure 3:
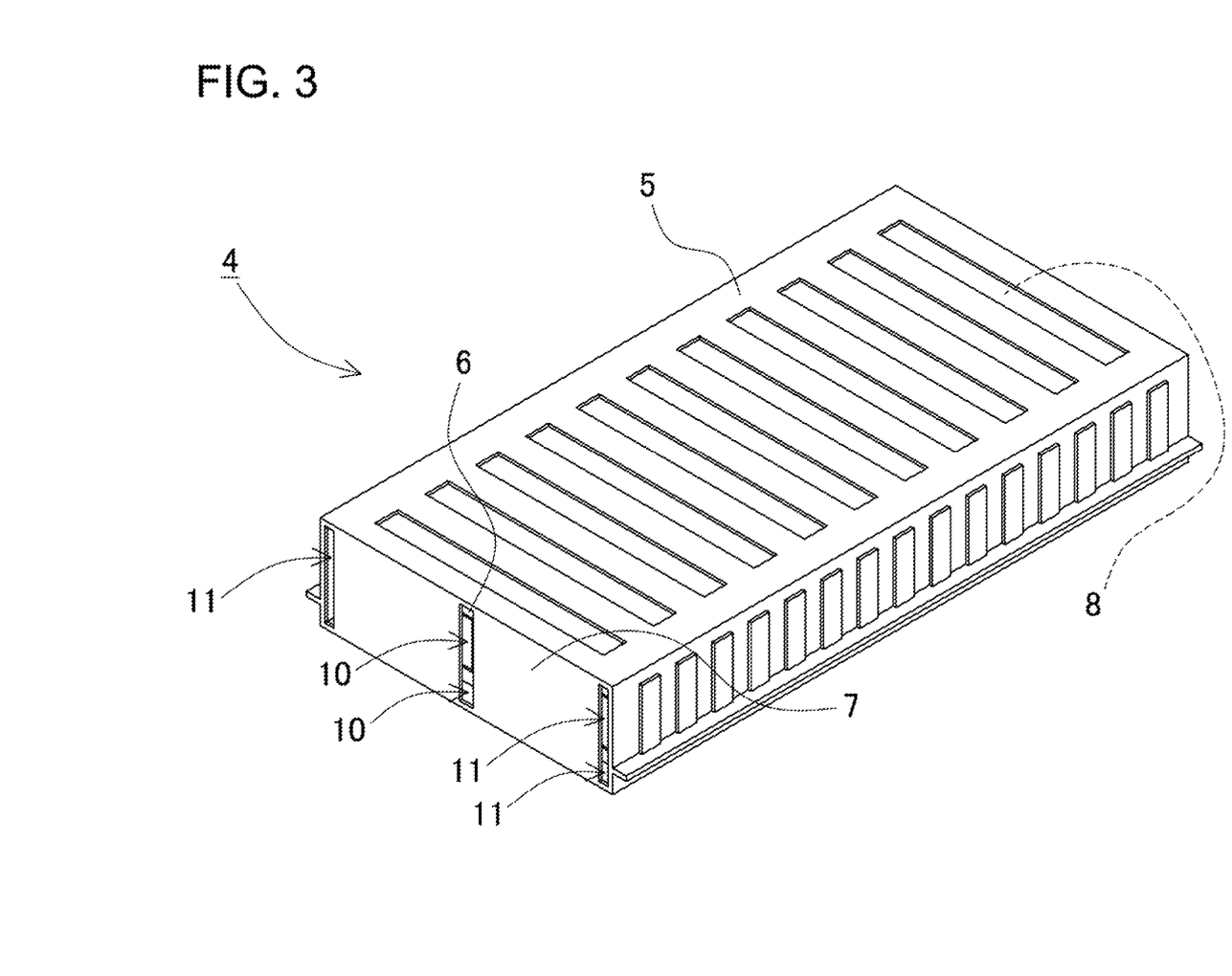
FIG. 3 is a perspective view showing the outward appearance of an accommodation case that accommodates batteries of the power supply device according to the present invention.

FIG. 3 is a perspective view showing an accommodation case 4 that accommodates the battery unit 2 composed of later-discussed battery modules 3 (3a, 3b, 3c, 3d) of the power supply device 1 to be installed in a vehicle or the like. The accommodation case 4 has a case structure composed of sectionally rectangular U-shaped upper and lower cases 5 and 6, and rectangular side surface cases 7 and 8 on both sides. The accommodation case 4 is formed of metal such as aluminum. The battery modules 3 are accommodated in the lower case 6 of the accommodation case 4. The upper case 5 covers the lower case 6. The battery modules 3 inside the accommodation case 4 are protected from shock and pressure from the outside.

As shown in FIG. 3, one inlet port 10 is formed in the center of one side case surface 7 of the accommodation case 4, and communicates with the later-discussed battery modules 3 (3*a*, 3*c*). Cooling air (coolant) is blown by operation of a cooling mechanism (not shown), and flows through the inlet port 10 into the accommodation case 3.

Outlet ports 11 are formed on both ends of the one side case surface 7 to interpose the inlet port 10 between the outlet ports 11. The outlet ports 11 communicate with the later-discussed battery modules 3 (3*a*, 3*c*). The cooling air is discharged through the outlet ports 11 from the accommodation case 4.

Also, an inlet port 10 and outlet ports 11 are formed on the other side case surface 8 on the other side in the same arrangement as the one side case surface 7. In addition, inlet ports 10 and outlet ports 11 are formed in the lower case 6 of the accommodation case 4 in positions that can communicate with the inlet and outlet ports 10 and 11 of the side case surfaces 7 and 8.

The cooling air flows through the inlet ports 10 into the accommodation case 4 and circulates along the peripheries of the batteries 20, which generate heat. After cooling the batteries, the cooling air is discharged through the outlet ports 11 from the accommodation case 4. In the power supply device 1, the opening area of one inlet port 10 is equal to the total opening area as the sum of the opening areas of the two outlet ports 11. Accordingly, the flow rate of the cooling air flowing through the inlet port 10 will be equal to the total flow rate of the two outlet ports 11. In the first embodiment, air blower cooling mechanisms (fan etc.) are used as the cooling mechanism that cools the batteries 20, and forcedly blows cooling air through the inlet ports 10 toward the outlet ports 11.

However, the cooling mechanism is not limited to the air cooling type of air blower cooling mechanism employed in this embodiment. For example, various types cooling mechanisms can be employed such as air suction type cooling mechanisms, water cooling type and coolant cooling type mechanisms, and the like. The cooling structure of the power supply device according to the present invention is not limited to the cooling structure that includes the inlet and outlet ports, and the like according to this embodiment. The present invention can be applied to power supply devices that include various types of cooling structures.

Figure 4:
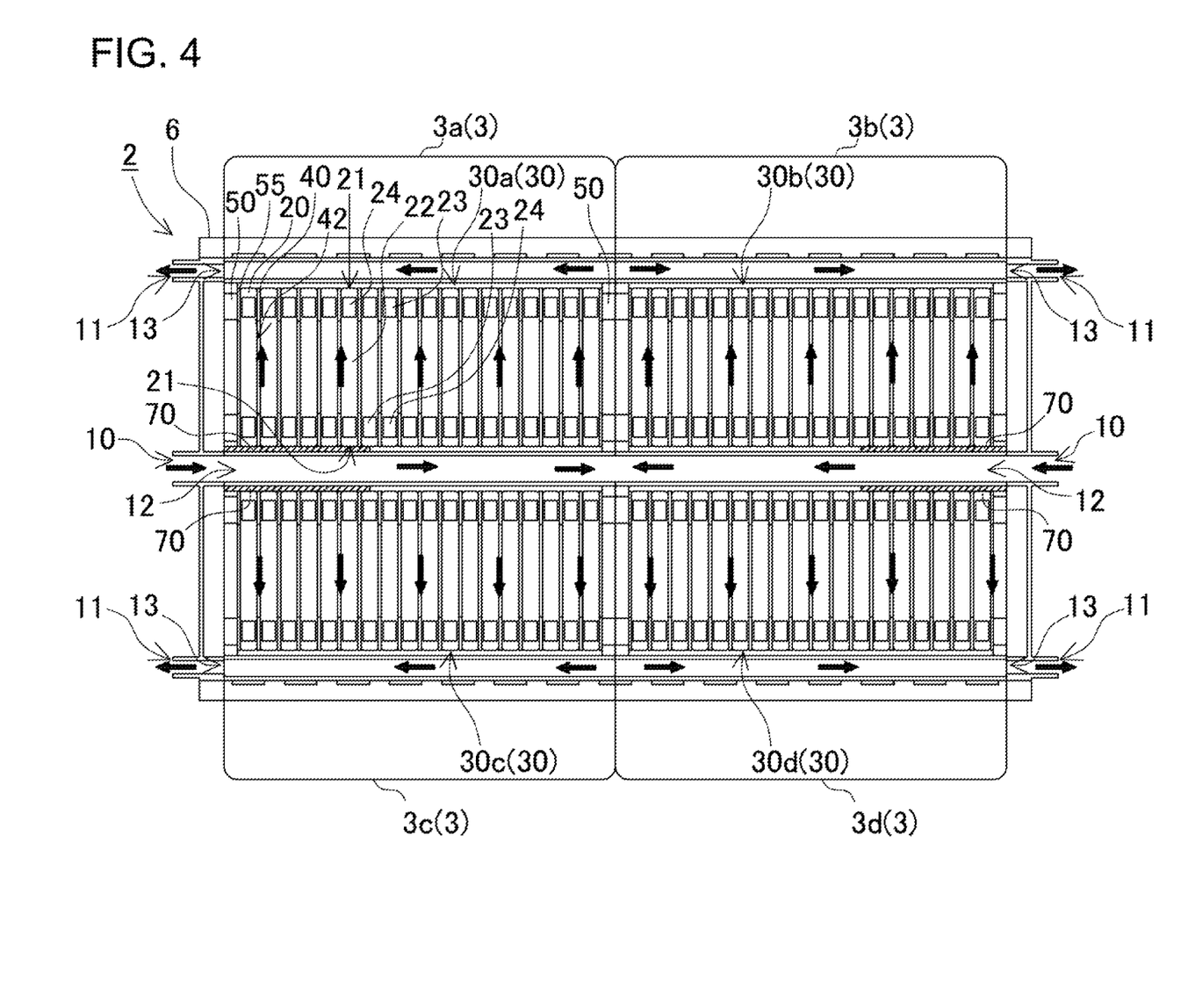
FIG. 4 is a plan view showing the internal structure of the batteries accommodated in the accommodation case.

FIG. 4 is a plan view showing the internal structure inside the lower case 6 as viewed from the top side of the accommodation case 4 with the upper case 5 of the accommodation case 4 being removed.

As shown in FIG. 4, four battery modules 3 (3*a*, 3*b*, 3*c*, 3*d*) are accommodated in the accommodation case 4, and are arranged in parallel to each other in two columns and two rows. Rectangular batteries 20 are arranged side by side in each battery module. A total of 72 batteries 20 inside the accommodation case 4 are all serially connected to each other. Thus, the power supply device 1 includes a high-output battery unit 2, which can supply high output voltage, and serves as a power supply that supplies electric power to the vehicle. However, in the battery module, the rectangular batteries can be connected to each other in parallel, or in a combination of parallel and serial connection. Alternatively, the battery module may be composed of one battery. Also, the accommodation case may include one battery module. The number of the battery modules inside the accommodation case is not limited.

In the power supply device 1, since a plurality of rectangular batteries 20 are connected to each other in series and are repeatedly charged/discharged at a large amount of current, the rectangular batteries 20 generate heat and increase in temperature. If the rectangular batteries 20 store the generated heat, the rectangular batteries 20 will deteriorate faster in performance. For this reason, it is necessary to cool the rectangular batteries 20. For this reason, the power supply device 1, shown in FIG. 4, includes the cooling structure for cooling the rectangular batteries 20. The following description will describe the cooling structure according to this embodiment.

Cooling air paths 42 are formed in gaps between the plurality of rectangular batteries 20 arranged side by side. Cooling paths 55 are formed in gaps between the batteries 20 and the end plates 50. When the cooling air passes through the cooling air paths 42 and 55, the rectangular batteries 20, which generate heat, are cooled. In addition, three flow paths are formed in the accommodation case 4. The cooling air flows through the three flow paths. One flow path among the three flow paths is an inlet flow path 12. The cooling air flows through the inlet flow path 12 before cooling batteries. The inlet flow path 12 communicates with the inlet ports 10, and faces side surfaces 21 of the plurality of rectangular batteries 20 arranged side by side. The inlet flow path 12 is formed in a part between battery modules 3 (3*a* and 3*c*) and in a part between battery modules (3*b* and 3*d*).

The other two flow paths are outlet flow paths 13. The cooling air flows through the outlet flow paths 13 after cooling the batteries. The outlet flow paths 13 communicate with the outlet ports 11, and face side surfaces 21 of the plurality of rectangular batteries 20 arranged side by side. The outlet flow paths 13 are formed between the battery modules 3 and the lower case 6. The outlet flow paths 13 and the inlet flow path 12 are arranged in parallel to each other. Each of the outlet flow paths 13 and the inlet flow path 12 interpose battery modules 3 between them, and communicate with cooling air paths 42 and 55.

That is, when the cooling air flows in the accommodation case 4, after the cooling air passes through the inlet port 10, the cooling air flows into the cooling air paths 42 and 55 while flowing through the inlet flow path 12. After efficiently cooling the rectangular batteries 20, which face the cooling air paths 42 and 55, the cooling air flows out of the cooling air paths 42 and 55, and then flows through the outlet flow paths 13. Finally, the cooling air is discharged through the outlet ports 11 from the accommodation case 4. Arrows in FIG. 4 indicate paths of the cooling air inside the accommodation case 4. However, although not illustrated, the arrangement and the numbers of the cooling air paths, the inlet flow paths, the outlet flow paths, the inlet ports and the outlet ports can be adjusted to suitable arrangement and numbers for the construction of power supply devices.

Figure 5:
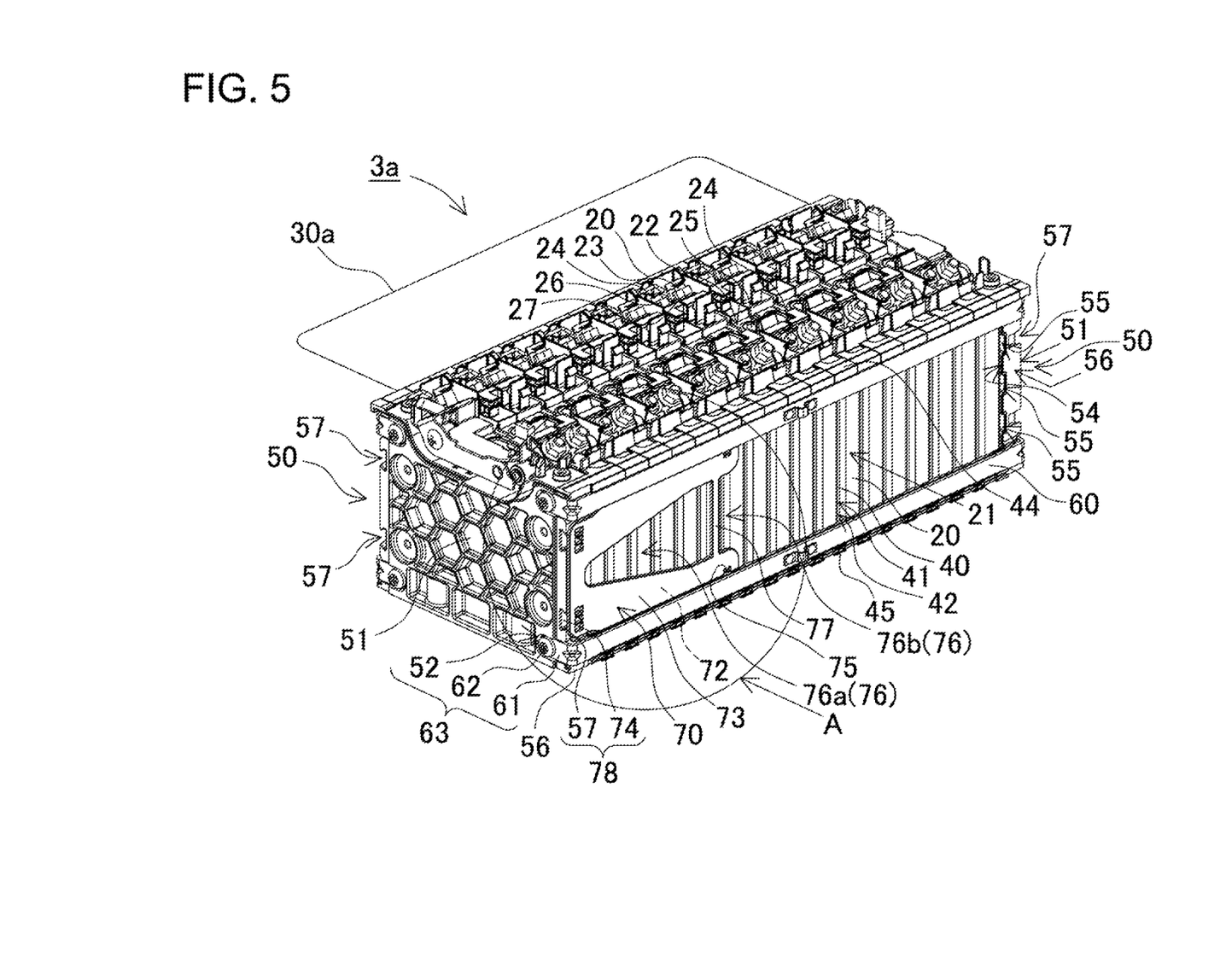
FIG. 5 is a perspective view showing the outward appearance of one battery module with a thermally-insulating member being attached to the battery module.

FIG. 5 is a perspective view showing the outward appearance of one battery module 3*a* to be accommodated in the accommodation case 4. In the battery module 3*a* shown in FIG. 5, 18 rectangular batteries 20 are arranged in the same orientation and are connected to each other in series. The battery module 3*a* includes a battery block 30 (30*a*), a pair of end plates 50, coupling members 60, and a thermally-insulating member 70. The rectangular battery 20 includes positive and negative electrode terminals 23 and 24. The battery block 30 (30*a*) includes a plurality of rectangular batteries 20 that are arranged side by side, and separators 40 that are sandwiched between the rectangular batteries 20. The end plates 50 are arranged on both ends of the battery block 30 (30*a*). The coupling members 60 are attached to the end plates 50, and hold the battery block 30 (30*a*). The thermally-insulating member 70 is attached to one of the end plates 50 and two of the coupling members 60.

The battery to be used for the battery module 3*a* is a rectangular flat-shaped battery 20. The corners of the battery are rounded. Since rectangular batteries can store energy at higher density per unit volume than cylindrical batteries, it is preferable that rectangular batteries be used in vehicles required to save space. Also, the rectangular battery 20 has a rectangular external shape. The width of the side surface 21 of the rectangular battery 20 is designed thin so that a plurality of rectangular batteries can be efficiently arranged side by side. The rectangular batteries 20 are lithium-ion rechargeable batteries, and have a large capacity relative to their weight and volume. Lithium-ion rechargeable batteries are suitable for a power source that drives the electric motor 81 for driving the vehicle. However, nickel-hydrogen batteries, nickel-cadmium batteries, fuel cells or the like can be used as the rectangular batteries.

The rectangular battery 20 has terminal end parts positioned slightly inward of the ends of an upper surface 22. Positive and negative terminals 23 and 24 are mounted to the terminal end parts. The terminals 23 and 24 have a bolt shape that has threads with which nut 26 threadedly engages. In addition, a gas relief valve 25 is constructed at the center of the upper surface 22 of the rectangular battery 20. An electrolysis solution injection port (not shown) is formed between the negative electrode terminal 24 and the gas relief valve 25.

The rectangular battery 20 has a metal exterior container. The rectangular batteries 20 are arranged side by side, and are electrically insulated from each other by the separators 40. Thus, the battery block 30a is composed of the rectangular batteries 20 and the separators 40. In the battery block 30a, the rectangular batteries 20 are arranged side by side with the positive and negative terminals 23 and 24 being arranged on the upper surface 22 of the rectangular battery 20 at positions symmetrically with respect to a point. The rectangular batteries 20 are arranged side by side with the left and right of the rectangular batteries 20 being flipped, in other words, with the rectangular batteries 20 being flipped from side to side. The positive and negative terminals 23 and 24 of adjacent rectangular batteries are connected to each other by busbars 27. Thus, the rectangular batteries 20 are connected to each other in series. The busbar 27 lies astride and is in contact with these positive/negative electrode terminals 23 and 24. The nuts 26 are screwed onto the bolt threads of these terminals so that the busbar 27 is securely mounted to these terminals adjacent to each other. The positive and negative terminals 23 and 24 adjacent to each other are electrically connected to each other through the busbar 27.

The separator 40 is formed of an electrically-insulating material such as plastic, and electrically insulates adjacent rectangular batteries 20 from each other. A battery-facing surface 41 of the separator facing the rectangular battery 20 has an external shape of substantially the same size as a surface of the rectangular battery 20. The width of the side surface of the separator is smaller than the side surfaces 21 of the rectangular battery 20. The separator 40 functions as a spacer that forms the cooling air paths 42 between rectangular batteries 20. To achieve this function, three cooling air paths 42 are provided as a cooling structure in the separator 40 by forming the battery-facing surface 41 into a rectangular or trapezoidal wave shape in section. However, the number of the cooling air paths 42 is not limited to three but can be less than or more than three. The cooling air passes through the cooling air paths 42 so that the rectangular batteries 20, which generate heat, can be efficiently cooled. Since the rectangular batteries arranged side by side are efficiently cooled, it is possible to suppress the deterioration of the rectangular batteries. Therefore, the performance of the rectangular batteries can be stable.

In addition, the separator 40 has an external shape with an upper surface 44 and a bottom surface 45 perpendicular to the battery-facing surface 41. Thus, the separators 40 also serve to position batteries 20 so as to prevent deviation of adjacent batteries 20 relative to each other. However, in the case where the exterior container of the battery is formed of an electrically-insulating material, batteries can be arranged side by side without separators to compose the battery module.

The coupling members 60 are attached to the end plate 50, which are arranged on both ends of the battery block 30a. The side-by-side arranged rectangular batteries 20 of the battery block 30a are securely held in the side-by-side arrangement direction by bolts 62.

The end plate 50 is formed of a metal material such as aluminum, and has an external shape with substantially the same size as the rectangular battery 20. However, the end plate may be formed of a resin material, or the like. The end plate 50 has recessed portions 52 at the four corner parts on a non-contact surface 51 that does not face a battery 20. The coupling members 60 are held in the recessed portions 52. Threaded holes 53 are formed at the center of the recessed portions 52. Since the recessed portions 52 are formed on the non-contact surface 51, it is possible to prevent protruding parts from appearing on the non-contact surface 51. Even when the coupling members 60 are attached onto the non-contact surface 51, the non-contact surface 51 of the end plate 50 can be flat.

The end plate 50 serves as a spacer that forms the cooling air paths 55 between rectangular batteries 20 similar to the separator 40. Three cooling air paths 55 are provided as a cooling structure on a contact surface 54 that faces the battery 20 by forming the contact surface 54 into a rectangular or trapezoidal wave shape in section. The cooling air flows through the cooling air paths 55 so that this rectangular battery 20, which generates heat, is efficiently cooled. However, the number of cooling paths 55 can be less than three or more than three. Since the rectangular batteries 20 arranged side by side are efficiently cooled, it is possible to suppress deterioration of the rectangular batteries 20. Therefore, the performance of the rectangular batteries can be stable.

The coupling member 60 is formed from an elongated plate-shaped metal material. The ends of the coupling member 60 are bent at a right angle. Thus, the coupling member 60 has bent portions 61. In addition, a threaded hole is formed at the center of the bent portion 61. The coupling members 60 are placed in parallel to each other on the upper and lower parts of both sides surfaces 21 of the rectangular batteries 20 that are coupled to the end plates 50. The bent portions 61 of the coupling member 60 are placed in the recessed portions 52 of the end plates 50. After that, the bolts 62 are inserted into and threadedly engaged with the threaded holes 53 of a coupling portion 63. Thus, the rectangular batteries 20 are securely held by the coupling members 60. Since the recessed portions 52 are formed in attachment parts that receive the coupling members 60 on the non-contact surface 51, it is possible to prevent the coupling members 60 from deviating in the vertical direction. However, the arrangement, the number or the material of the coupling members for holding the battery block may be changed. The coupling members may be attached by an attachment method other than a threaded engagement.

As shown in FIG. 4, cooling air is blown by operation of the cooling mechanism, and flows into the inlet ports 10. After that, the cooling air flows through the inlet flow path 12 into the cooling air paths 42 and 55. The flow rate of the cooling air increases in accordance with proximity to the inlet port 10, and decreases with the distance from the inlet port 10. For this reason, in this embodiment, a rectangular battery 20 in proximity to the inlet port 10 is likely to be cooled excessively, while a rectangular battery 20 remote from the inlet port 10 is likely to be inefficiently cooled and be over-heated. As a result, temperature unevenness ΔT is likely to appear among the rectangular batteries 20 in the accommodation case 4. ΔT can be obtained as the temperature difference by subtracting the lowest temperature from the highest temperature in the rectangular batteries 20 in the accommodation case 4. If such temperature unevenness appears when the batteries in the battery module are cooled, performance unevenness will also appear among the batteries. This unevenness will be increased as the batteries are used for a long period of time. Accordingly, the charging/discharging capacities of the power supply device will decrease. Also, some of the batteries will be easily overcharged/over-discharged, which in turn accelerates the deterioration of some batteries. Consequently, such unevenness may cause life reduction of the power supply device as a whole.

Large temperature unevenness ΔT means that some batteries may remarkably deteriorate. For this reason, in vehicle power supply devices, the deterioration of some batteries results in a problem of the power supply device as a whole, and reduces the entire performance of the power supply device. If one of batteries cannot be used, a power supply device cannot be used that is composed of a plurality of batteries serially connected to each other. For the aforementioned reason, although it is also important for vehicle power supply devices to maintain battery temperatures lower than a predetermined temperature, it is more important to control the temperatures of the batteries so as to evenly cool the batteries, which are arranged side by side, so that the temperature differences ΔT among the batteries is minimized.

Accordingly, in the embodiment according to the present invention, as shown in FIG. 5, in order to raise the temperature of a rectangular battery 20 in proximity to the inlet port 10, which is likely to be over-cooled, the thermally-insulating member 70 is attached on a part of battery module 3 (3a, 3b, 3c, 3d). The following description will describe exemplary attachment of the thermally-insulating member 70 onto the battery module 3 (3a, 3c) with reference to FIGS. 6 to 9.

Figure 6:
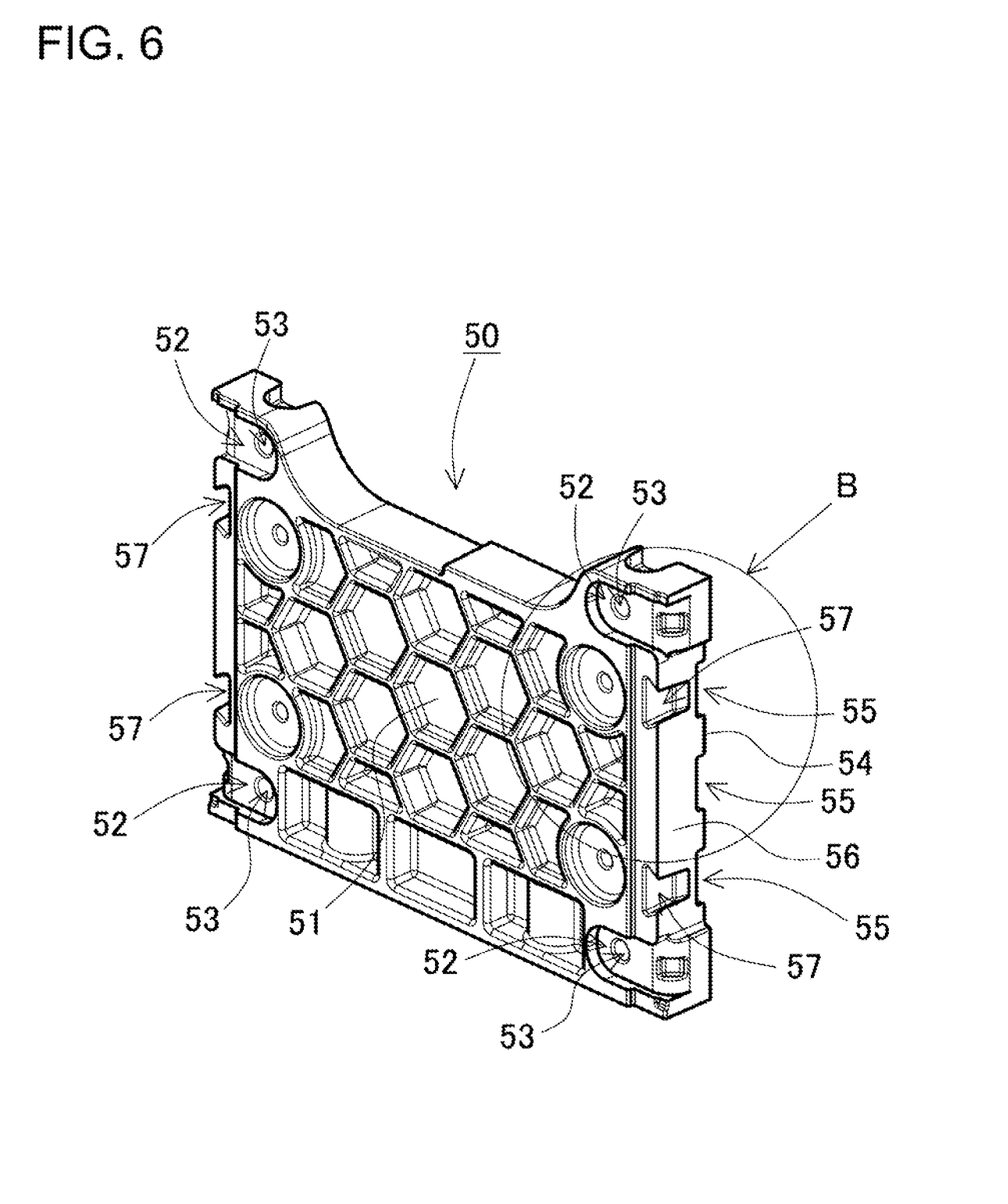
FIG. 6 is an enlarged perspective view showing the outward appearance of one of end plates.
Figure 7:
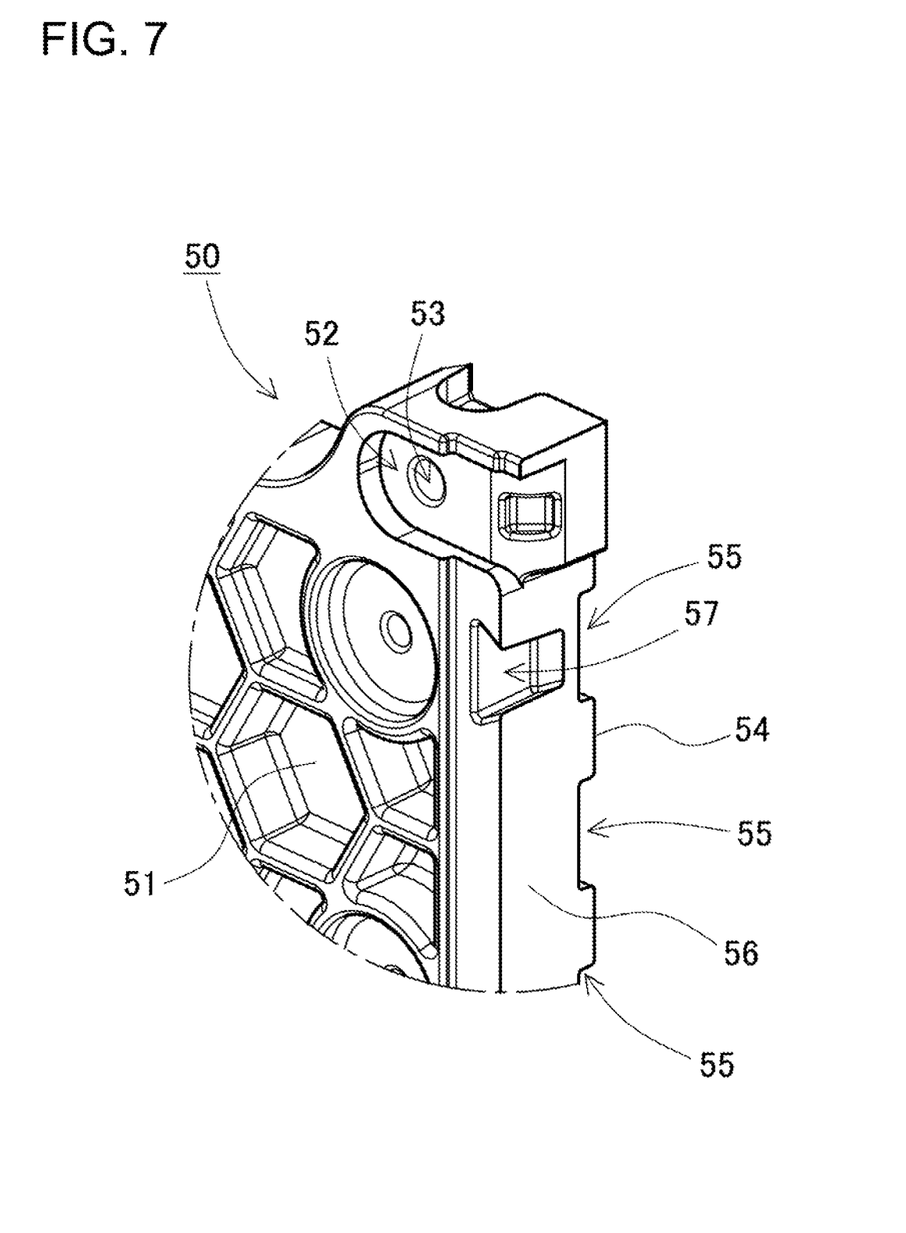
FIG. 7 is an enlarged view showing a part B in FIG. 6.

FIG. 6 is an enlarged perspective view showing the outward appearance of the plate 50 onto which the thermally-insulating member 70 can be attached. FIG. 7 is an enlarged view showing an attachment part 78 (part B in FIG. 6) onto which the thermally-insulating member 70 can be attached. Two receiving portions 57 are formed on each of the side surfaces 56 of the end plate 50. The thermally-insulating member 70 is attached into the receiving portions 57. The receiving portions 57 are located slightly inward of the recessed portions 52. The receiving portion 57 has a recessed shape. The side walls of the recessed shape are tapered so that the width of the recessed shape increases with the distance from the side surface of the end plate side surface 56. Thus, the receiving portion 57 composes a fit-in structure. The recessed shape of the receiving portion 57 extends to the non-contact surface 51 of the end plate 50. Accordingly, as viewed from the non-contact surface 51 side, the receiving portion 57 of the end plate 50 has an external shape forming a truncated triangle shape (not shown). Since the receiving portion 57 forms the fit-in structure, the thermally-insulating member 70 can be firmly attached to the end plate 50. Therefore, the thermally-insulating member 70 is less likely to be detached by shocks and the like. The end plate 50 according to this embodiment has a symmetrical shape with respect to a line. Therefore, it is possible to provide commonality of parts. However, the thermally-insulating member 70 can be attached by a method other than a fit-in structure. The arrangement, the number, the shape and the like of the fit-in structures are not limited.

Figure 8:
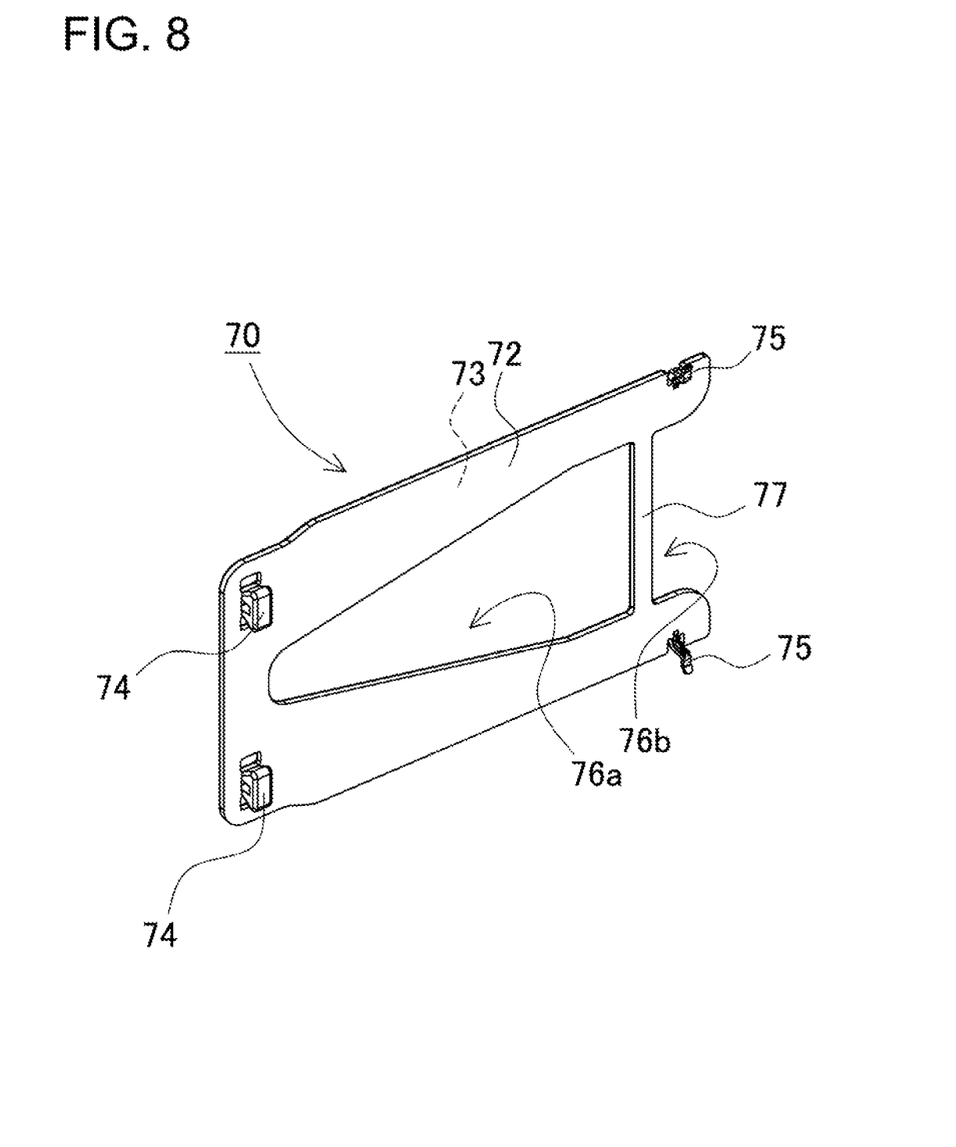
FIG. 8 is an enlarged perspective view showing the thermally-insulating member to be attached to the battery module.

FIG. 8 is an enlarged perspective view showing the thermally-insulating member 70 to be attached to the end plate 50. The thermally-insulating member 70 shown in FIG. 8 has a thin rectangular plate shape. The thermally-insulating member 70 is formed of a resin material such as ABS (acrylonitrile-butadiene-styrene) resin. Thus, the heat insulation effect of the thermally-insulating member 70 can be high. In addition, a short circuit does not occur between the thermally-insulating member 70 and another component. Therefore, the thermally-insulating member 70 can be safely used. Also, the thermally-insulating member 70 of resin material can be easily shaped. However, the material of the thermally-insulating member can be changed depending on the construction or the like of the batteries to be used.

When the thermally-insulating member 70 is attached onto the battery module 3, a back side 72 refers to one surface of the thermally-insulating member 70 that faces the battery block side. A front side 73 refers to the other surface that is opposite to the back side 72. Insertion portions 74 are formed on the back side 72 of the thermally-insulating member 70, and can be inserted into the receiving portions 57 of the end plate 50. The insertion portions 74 protrude from fit-in positions corresponding to the receiving portions 57 formed in the end plate 50, and have a shape that can be fitted into the recessed shape of the receiving portions 57. The insertion portions 74 are shaped as parts of the thermally-insulating member 70. Thus, the insertion portions 74 have an integral external shape that is complimentary with respect to the thermally-insulating member 70.

In addition, two hook portions 75 are formed on the thermally-insulating member 70, and have an L shape. Thus, the two hook portions 75 can be hooked on two coupling members 60 so that the thermally-insulating member 70 can be held on the two coupling members 60. Accordingly, the two hook portions 75 can prevent that the thermally-insulating member 70 from flapping or being detached by shock and the like. The hook portions 75 are arranged in one end part of the thermally-insulating member 70 opposite to the insertion portions 74. Similar to the insertion portions 74, the hook portions 75 are shaped as parts of the thermally-insulating member 70. Thus, the hook portions 75 are integral with the thermally-insulating member 70.

In addition, the thermally-insulating member 70 has a cut-out portion 76 that is formed by cutting out a part of the thermally-insulating member 70. The shape of the cut-out portion 76 is designed depending on the cooled states of the rectangular batteries 20 to be in contact with the thermally-insulating member 70. The opening of the cut-out portion 76 is reduced to increase the contact area with a rectangular battery 20 that is likely to be cooled too much. The opening of the cut-out portion 76 is increased to reduce the contact area with a rectangular battery 20 that is likely to be inefficiently cooled. In the case where the cut-out portion is formed, batteries can be thermally insulated from cooling air depending on heat insulation requirements of batteries that are likely to be cooled to a relatively low temperature. Therefore, it is possible to minimize battery temperature unevenness, that is, to even battery temperatures. Also, a part of the thermally-insulating member without the cut-out portion closes cooling paths so that cooling air cannot flow into these closed cooling paths. Accordingly, it is not necessary to shape the separator and the end plate into different shapes. As a result, it is possible to provide commonality of parts. Therefore, it is possible to greatly reduce cost and man-hour. In addition, the levels of thermal insulation or cooling performance can be varied by adjusting the size of the cut-out portion.

Figure 9:
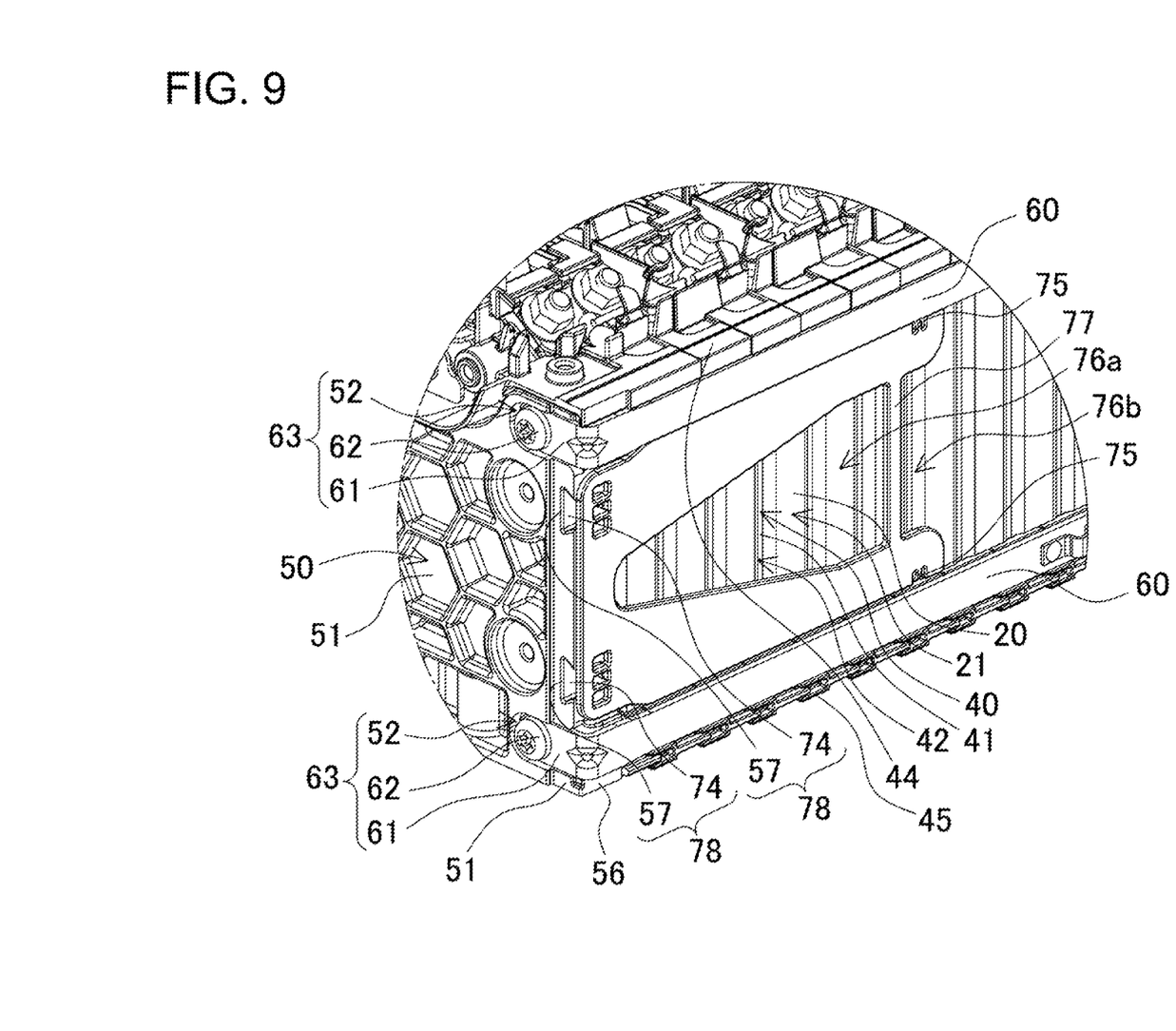
FIG. 9 is an enlarged view showing a part A in FIG. 5.

In order to prevent strength reduction of the thermally-insulating member 70 caused by the cut-out portion 76, the thermally-insulating member 70 is provided with a supporting portion 77 that divides the cut-out portion 76. Since the supporting portion 77 divides the cut-out portion, a first cut-out portion 76a and a second cut-out portion 76b are formed on the both sides of the supporting portion 77. The supporting portion 77 has an elongated plate-shaped external shape with a width smaller than the battery side surfaces 21. As shown in FIG. 9, the supporting portion 77 is in contact with the side surface 21 of a sixth rectangular battery 20 from the end plate side.

The first cut-out portion 76a includes an isosceles triangular part that has a vertex on a boundary between the end plate 50 and a battery 20 adjacent to the end plate 56, and a height extending from this vertex to the midpoint of the side surface 21 of a fifth battery 20. The vertex of the isosceles triangular part is rounded. The first cut-out portion 76a further includes a rectangular part that is defined by the bottom edge of the isosceles triangular part and a line that is obtained by moving this bottom edge to the supporting portion 77 in parallel. The second cut-out portion 76b gives rounded shapes to tails of the thermally-insulating member 70. Since the thermally-insulating member 70 according to this embodiment has a symmetrical external shape, the thermally-insulating member 70 will not produce a turbulent flow or an eddy in cooling air flowing through the inlet port 10. Therefore, the cooling air can smoothly flow.

The following description will describe attachment of the thermally-insulating member 70 with reference to FIG. 9.

FIG. 9 is an enlarged view showing an attachment part (a part A in FIG. 5) of the battery module 3 (3a, 3c) onto which the thermally-insulating member 70 is attached. In attachment of the thermally-insulating member 70 onto the battery module 3, first, the insertion portions 74 of the thermally-insulating member 70 are press-fitted into the receiving portions 57 of the end plate 50 from the non-contact surface side of the end plate 50. Then, the two hook portions 75 formed in the thermally-insulating member 70 are holed on and attached to the two coupling members 60. After that, the thermally-insulating member 20 is partially sandwiched between the upper and lower coupling members 60, and the battery side surfaces 21. Accordingly, even if vertical and horizontal vibrations or shocks are strongly applied to the thermally-insulating member 70, the insertion portions 74 and the hook portions 75 are not disengaged. Therefore, the thermally-insulating member 70 can be firmly attached. In addition, since the thermally-insulating member 70 is attached to the end plate 50 and the coupling members 60, an additional component is not required for the attachment. Since the thermally-insulating member is attached by a fit-in structure, the thermally-insulating member can be easily attached to the battery module. Therefore, it is possible to greatly reduce cost and man-hour.

The thermally-insulating member 70 is arranged substantially adjacent to the two coupling members 60, which horizontally extend in the upper and lower part of the battery side surface 21 in parallel to each other. The back side 72 of the thermally-insulating member 70 is arranged along the side-by-side arrangement direction of the end plates 50 and the batteries 20. The back side 72 of the thermally-insulating member 70 is in contact with the end plate side surface 56 and the battery side surfaces 21. Thus, the thermally-insulating member 70 is located closer to the rectangular batteries 20 than the coupling members 60. Since the thermally-insulating member 70 is in contact with the battery side surfaces 21 without gap, the thermally-insulating member 70 can cut off dissipation of heat generated from the rectangular batteries 20. Accordingly, the heat is stored in the cooling air paths 42 and 55 of the separators 40 and the end plate 50 so that the rectangular batteries 20 are kept warm. Therefore, it is possible to raise the temperatures of the batteries. Consequently, it is possible to reduce battery temperature unevenness in the power supply device. In addition, since heat generated by a battery is effectively used to warm the battery, it is possible to reduce the cost of warming a battery. Also, since cooling air that flows into the cooling air paths 42 and 55 is cut off, the flow-in rate of the cooling air can be reduced, and it is possible to prevent batteries 20 near the inlet port 10 from being over-cooled. However, the thermally-insulating member can be attached without contacting the batteries.

The length of the thermally-insulating member 70 in the side-by-side arrangement direction of the rectangular battery 20 is about a third of the battery module 3 (the sum of the width of side surfaces 56 of the end plates 50, and six and half widths of side surfaces 21 of the rectangular batteries). When the thermally-insulating member 20 is attached onto the battery module 3, the thermally-insulating member 20 is located inside the coupling members 60. As a result, even when the thermally-insulating member 70 is attached, the width of the inlet flow path 12 is not reduced. Therefore, pressure loss is prevented in the inlet flow path 12.

In the power supply device 1 according to this embodiment, a rectangular battery 20 in proximity to the inlet port 10 is likely to be over-cooled, while the temperatures of rectangular batteries 20 increase with the distance from the inlet port 10. For this reason, the thermally-insulating member 70 is arranged on the inlet port side. The opening of the cut-out portion 76 increases with the distance from the inlet port 10. The contact areas between the thermally-insulating member 70 and the batteries 20 are adjusted by the cut-out portion 76 so that the temperature unevenness is reduced between a rectangular battery 20 in proximity to the inlet port 10 and a rectangular battery 20 remote from the inlet port 10.

Specifically, a rectangular battery 20 in proximity to the end plate 50 is cooled by cold cooling air at a high flow rate, and the heat generated by this rectangular battery 20 is dissipated to the cold aluminum end plate 50. As a result, this rectangular battery 20 is likely to be over-cooled. For this reason, the opening of the cut-out portion 76 is small at the rectangular battery 20 in proximity to the end plate 50 so that the heat insulation effect can be high with respect to this battery 20. The temperatures of batteries increase with the distance from end plate 50 on the inlet port side. Correspondingly, the opening area of the cut-out portion 76 gradually increases. The temperature difference between rectangular batteries 20 decreases with the distance from the end plate 50. In this embodiment, sixth to the last batteries from the end plate side will have almost no temperature difference among them. For this reason, the opening area of the cut-out portion 76 of the thermally-insulating member 70 becomes almost constant in the fifth to seventh batteries from the end plate side. In other words, the contact areas between the thermally-insulating member 70 and rectangular batteries 20 vary little in the fifth to seventh batteries from the end plate side.

In addition, since the end plate 50 is formed of aluminum and is likely to be cooled, the cut-out portion 76 is not formed in a part of the thermally-insulating member 70 in contact with the end plate 50. Thus, the end plate 50 is not exposed to cooling air flowing through the inlet port 10. The reason is to prevent that the temperature of the battery 20 adjacent to the end plate 50 from decreasing too much when the end plate 50 is excessively cooled by the cooling air.

In this embodiment, the thermally-insulating member 70 is arranged only on the battery side surfaces 21 on one side, that is, only on a side of the battery module 3 that faces the inlet flow path 12 (see FIG. 4). The reason is that the thermally-insulating member 70 serves not only to thermally insulate heat generated by a rectangular battery 20 but also to reduce the flow rate of cooling air flowing from the inlet port 10. However, the arrangement, the number, the shape, the material and the attachment parts of thermally-insulating members are not limited to this embodiment. Any type of thermally-insulating member can be used for any type of battery modules composed of batteries. Also, the attachment method of the thermally-insulating member and components to hold the thermally-insulating member are not limited to this embodiment. For example, thermally-insulating members can be arranged on both sides of the battery module in a modified embodiment. The thermally-insulating member can be attached to a component other than the end plate and the coupling member in another modified embodiment. The thermally-insulating member can be attached by a method other than the method using threaded engagement between the bolts and the threaded holes in another modified embodiment. The shape of the thermally-insulating member can be changed in still another modified embodiment. These modified embodiments are not specifically limited.

The power supply device according to this embodiment of the present invention has been described with reference to FIGS. 5 and 9 showing the construction of the battery module 3 (3a). In other battery modules 3 (3b, 3d) accommodated in the accommodation case, it is only required that the arrangement of the thermally-insulating member is changed. First, the thermally-insulating member 70 attached to the battery module 3 (3a, 3c) shown in FIGS. 5 and 9 is flipped from the front side 73 to the back side 72. Then, the insertion portions 74 of the flipped thermally-insulating member 70 are press-fitted into receiving portions 57 of the end plate 50 that have not received the thermally-insulating member 70 in the case of FIGS. 5 and 9. Since the end plate 50 and the thermally-insulating member 70 have symmetry, the arrangement of the thermally-insulating member can be easily changed. In other battery modules, such as the battery module 3c shown in FIG. 4, the same arrangement as the battery module 3a is applicable, arranged in a 180° turned position. According to the present invention, since the battery module 3 (3a, 3b, 3c, 3d) can be similarly constructed before the thermally-insulating member 70 is attached, the power supply device can be produced at high productivity and can be suitably mass-produced. Therefore, the thus-constructed power supply device can be flexibly changed in design as required.

The present invention can be suitably applied to power supply devices for vehicles such as a hybrid car and an electric vehicle. Also, the present invention can be suitably applied to power supply devices other than vehicle power supply device.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2009-248595 filed in Japan on Oct. 29, 2009, the content of which is incorporated herein by reference.

What is claimed is:

1. A power supply device comprising:
a battery module including a plurality of batteries arranged side-by-side, and a plurality of separators arranged between adjacent ones of the batteries, respectively;
a first end plate arranged on a first end of the battery module;
a second end plate arranged on a second end of the battery module;
a cooling mechanism that cools the batteries;
a thermally-insulating member arranged on or over a part of a surface of the battery module, the thermally-insulating member thermally insulates heat generated from at least one of the batteries; and
an accommodation case that accommodates the battery module and has inlet and outlet ports,
wherein the separators and the end plates form cooling paths on sides thereof that face the batteries, respectively,
wherein each of the cooling paths is formed to allow coolant to pass therethrough by the cooling mechanism,
wherein the thermally-insulating member is positioned so as to extend over two or more of the cooling paths which are arranged in a stacking direction of the batteries so that each of the cooling paths covered by the thermally-insulating member is at least partially blocked, and
wherein the cooling mechanism is arranged to pass the coolant through the inlet and outlet ports, and the thermally-insulating member is disposed on or above at least one of the batteries located in proximity to the inlet port.

2. The power supply device according to claim 1, wherein the thermally-insulating member is in contact with the at least one of the plurality of batteries.

3. The power supply device according to claim 1, wherein the thermally-insulating member extends over two or more batteries so that contact areas between the two or more batteries and the thermally-insulating member decrease or get closer to constant with an increasing distance from the inlet port.

4. The power supply device according to claim 1, further comprising coupling members that hold the end plates and the battery module, wherein the end plates and the battery module are interposed between the ends of the coupling members, and the thermally-insulating member is attached to the first end plate.

5. The power supply device according to claim 4, wherein the thermally-insulating member is attached to the first end plate by a fit-in structure.

6. The power supply device according to claim 5, wherein the first end plate has a receiving portion that securely receives the thermally-insulating member, wherein the thermally-insulating member includes an insertion portion that can be inserted into the receiving portion of the first end plate, wherein the insertion portion is fitted into the receiving portion of the first end plate to secure the thermally-insulating member to the first end plate.

7. The power supply device according to claim 6, wherein the receiving portion is formed as a recess, and side walls of the recess are tapered so that a width of the recess increases with an increasing distance from a side surface of the first end plate so that the receiving portion forms the fit-in structure.

8. The power supply device according to claim 6, wherein the insertion portion is integrally formed with the thermally-insulating member.

9. A power supply device comprising:
a battery module including a plurality of batteries arranged side-by-side, and a plurality of separators arranged between adjacent ones of the batteries, respectively;

a first end plate arranged on a first end of the battery module;

a second end plate arranged on a second end of the battery module;

a cooling mechanism that cools the batteries; and a thermally-insulating member arranged on or over a part of a surface of the battery module, the thermally-insulating member thermally insulates heat generated from at least one of the batteries, wherein the separators and the end plates form cooling paths on sides thereof that face the batteries, respectively, wherein each of the cooling paths is formed to allow coolant to pass therethrough by the cooling mechanism, wherein the thermally-insulating member is positioned so as to extend over two or more of the cooling paths which are arranged in a stacking direction of the batteries so that each of the cooling paths covered by the thermally-insulating member is at least partially blocked, and wherein the power supply device further comprises coupling members that hold the end plates and the battery module in a stacked arrangement, wherein the end plates and the battery module are interposed between ends of the coupling members, wherein the thermally-insulating member is attached to the coupling members.

10. The power supply device according to claim 9, wherein the thermally-insulating member is attached to the coupling members by a fit-in structure.

11. The power supply device according to claim 10, wherein the thermally-insulating member includes L-shaped hook portions that are hooked on the coupling members to secure the thermally-insulating member to the coupling members.

12. The power supply device according to claim 9, wherein the thermally-insulating member is attached to one of the end plates.

13. The power supply device according to claim 12, wherein the thermally-insulating member is attached to the first end plate and the coupling members by a fit-in structure.

14. A power supply device comprising:

a battery module including a plurality of batteries arranged side-by-side, and a plurality of separators arranged between adjacent ones of the batteries, respectively;

a first end plate arranged on a first end of the battery module;

a second end plate arranged on a second end of the battery module;

a cooling mechanism that cools the batteries; and a thermally-insulating member arranged on or over a part of a surface of the battery module, the thermally-insulating member thermally insulates heat generated from at least one of the batteries, wherein the separators and the end plates form cooling paths on sides thereof that face the batteries, respectively, wherein each of the cooling paths is formed to allow coolant to pass therethrough by the cooling mechanism, wherein the thermally-insulating member is positioned so as to extend over two or more of the cooling paths which are arranged in a stacking direction of the batteries so that each of the cooling paths covered by the thermally-insulating member is at least partially blocked, and wherein the thermally-insulating member is formed of a resin material.

15. The power supply device according to claim 14, wherein the thermally-insulating member is formed of acrylonitrile-butadiene-styrene resin (ABS).

16. The power supply device according to claim 1, wherein the thermally-insulating member defines an open area that extends over a plurality of the cooling paths arranged in the stacked direction of the batteries.

17. The power supply device according to claim 1, wherein:

the battery module further comprises coupling members that hold the batteries in a stacked state;

each of the coupling members is connected to both of the first and second end plates: and the coupling members are placed in parallel to each other on upper and lower parts of a side surface of the battery module, and the thermally-insulating member is located between the coupling members.

* * * * *